United States Patent
Sazawa et al.

(10) Patent No.: US 7,194,532 B2
(45) Date of Patent: Mar. 20, 2007

(54) DISTRIBUTED FILE MANAGEMENT METHOD AND PROGRAM THEREFOR

(75) Inventors: Shinichi Sazawa, Kawasaki (JP); Yuichi Sato, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 125 days.

(21) Appl. No.: 10/338,840

(22) Filed: Jan. 9, 2003

(65) Prior Publication Data

US 2003/0212571 A1  Nov. 13, 2003

(30) Foreign Application Priority Data

May 7, 2002  (JP) ............................. 2002-131302

(51) Int. Cl.
*G06F 12/00* (2006.01)

(52) U.S. Cl. .................... 709/223; 709/214; 709/224; 709/216; 709/225; 709/201; 709/218; 709/213; 711/130; 711/113; 711/112; 711/147

(58) Field of Classification Search ................ 709/213, 709/203, 201, 216, 244; 711/118, 114
See application file for complete search history.

(56) References Cited

U.S. PATENT DOCUMENTS

| 6,438,652 B1* | 8/2002 | Jordan et al. ............... 711/120 |
| 6,820,122 B1* | 11/2004 | Mandler et al. ............ 702/226 |
| 2003/0037094 A1* | 2/2003 | Douceur et al. ............ 709/201 |

* cited by examiner

*Primary Examiner*—B. James Peikari
(74) *Attorney, Agent, or Firm*—Staas & Halsey LLP

(57) ABSTRACT

In a management information generating step, management information of disks opened by a plurality of peers connected through a network is generated. In an access request step, another peer which opens a disk is selected from the management information, and a file is requested to be stored or read. In an access execution step, the file is stored or read in response to the storage request or the read request from the other peer.

18 Claims, 18 Drawing Sheets

FIG. 4

| PEER NAME | IP ADDRESS | OPEN DISK FREE AREA | DISK FREE AREA |
|---|---|---|---|
| PC1 | aaa.aaa.aaa | 10GB | 7GB |
| PC2 | bbb.bbb.bbb | 5GB | 4GB |
| PC3 | ccc.ccc.ccc | 10GB | 4GB |
| PC4 | ddd.ddd.ddd | 5GB | 3GB |
| PC5 | eee.eee.eee | 8GB | 4GB |
| PC6 | fff.fff.fff | 12GB | 10GB |
| PC7 | ggg.ggg.ggg | 15GB | 12GB |

FIG. 5

| FILE NAME | DESTINATION PEER NAME |
|---|---|
| AAA | PC1 |
| BBB | PC1 |
| CCC | PC5 |
| DDD | PC2 |
| EEE | PC4 |
| FFF | PC3 |
| GGG | PC6 |

| PEER NAME | IP ADDRESS | DISK FREE AREA |
|---|---|---|
| PC1 | aaa.aaa.aaa | 3GB |
| PC2 | bbb.bbb.bbb | 2GB |
| PC3 | ccc.ccc.ccc | 4GB |
| PC4 | ddd.ddd.ddd | 5GB |

| FILE NAME | DESTINATION PEER NAME |
|---|---|
| AAA | PC2 |
| BBB | PC2 |
| CCC | PC3 |
| DDD | PC2 |
| EEE | PC3 |
| FFF | PC3 |
| GGG | PC2 |

DISTRIBUTED FILE MANAGEMENT METHOD AND PROGRAM THEREFOR

BACKGROUND OF THE INVENTION

1. Field of the Invention

The present invention relates to a distributed file management method for performing distributed management of files between computers connected in a peer-to-peer manner and a program therefor and, more particularly, to a distributed file management method in which computers use open disk resources on a network to perform distributed management of files and a method therefor.

2. Description of the Related Arts

In recent years, most of computers are connected to networks, and resources such as files and printers are popularly shared by the computers connected through the networks.

The resource sharing by using a network is expanded to disks serving as CPU resources of computers connected through the network. A user has a sufficient free area on her/his disk opens the disk on the network to make it possible to use the disk by other users. For example, a dedicated folder is formed to open a disk on a network, the folder is shared, and the access type of the folder is set as a full access type to make it possible to use the folder for an access of another computer connected to the network.

However, at the present, in order to use the resources of another computer by a user, the user herself/himself must designate a location of the resources. For example, when a user of a computer intends to use a free disk of another computer, the user does not know a disk of a specific computer to be used. The user must actually access a computer connected to the network to search the disk, and the user takes heavy labor and long time to use the free disk. When large-capacity data is shared through a network, a cache technique is important. In a conventional cache technique, cache data is managed and stored in only a specific server. For this reason, cache performance is determined by the server, and a large cache considerably increases cost. For this reason, it is difficult to cope with the large cache.

SUMMARY OF THE INVENTION

According to the present invention, there is provided a distributed file management method which efficiently uses disk resources of a plurality of computers connected in a peer-to-peer manner through a network to manage files and a program therefor.

According to the present invention, there is provided a distributed file management method which uses disk resources of a plurality of computers connected in a peer-to-peer manner through a network to realize a large cache at a low price and a program therefor.

The distributed file management method according to the present invention is realized as a process of a plurality of computers (to be referred as "peers" hereinafter) connected in a peer-to-peer manner through a network. A distributed file management method according to the present invention applied to the peers connected through the network including:

the management information generating step of generating management information of disks opened by the plurality of peers connected through the network;

the access request step of selecting another peer which opens a disk from the management information to request a file to be stored or read; and the access execution step of executing the storage of the file or the read of the file in response to the storage respect or the read request from the other peer. For this reason, when the distributed file management method according to the present invention, more specifically, when a program for realizing the method is started, management information of disk resources opened by the plurality of peers connected through the network is automatically generated, and a user can efficiently perform distributed use of files by arbitrarily selecting a peer to be used from a resource list or the like.

In this case, management information of the opened disk includes open disk management information representing the address of a peer and the capacity of a free disk and distributed file management information representing a peer for storing a file. For this reason, a user can recognize an available disk on a network from the open disk management information, can recognize a specific peer in which a specific file is stored from the distributed file management information, and can easily manage the files.

In the management information generating step according to the present invention, management information of a disk opened to a registry server connected through the network is registered. In this case, in the access request step, another peer is selected from the management information of the registry server to request storage or read of a file. In this manner, the management information of the disk sources opened onto the network is efficiently unified by the registry server, and the registry server handles only the management information and does not store a file. For this reason, the distributed file management information can be realized with a small capacity and a small load at a low cost.

As another aspect of the present invention, in the management information generating step, management information of a disk opened to an access from another peer is answered, and all the other peers are accessed to acquire management information of the opened disk. This step does not require a registry server. Broadcast on a sub-net or the like is used, so that the peers have the management information of the disk opened onto the network. In the management generating step executed when the registry server is not necessary, a copy of the generated management information is stored in a specific peer to make it possible to restore the management information when the management information is lost. For example, as a destination to which the management information is copied, an unused terminal is generally allocated. Even though a peer which opens disk resources is disordered, the management information is acquired from the destination after the disordered peer is recovered, and the use of distributed files can be restarted.

In the access request step, when a file is stored in another file, the file is encoded and requested to be stored. When this encoding is performed, even though the file is separately stored in another peer, the file can be accessed by only an authenticated user. Even though the file is stored in the other peer, the security of the file is assured. In the access request step, when a file is stored in another file, after the file is divided into partial files, the partial files are respectively encoded and requested to be stored in other peers. The file is divided into pieces, and the pieces are encoded and stored in different peers, so that security can be made more strong.

In the distributed file management method according to the present invention further includes the file moving step of moving stored files in another peer to still another peer at once when disclosure of a disk is stopped. For example, a terminal which has been used as a peer is wasted, stored distributed files are moved to another terminal at once, and files stored in another peer are assured. The distributed file management method according to the present invention further includes the cache process step of, when the resources are downloaded, acquiring information of a peer which caches the resources from the cache management information (cache directory) of a registry server connected through the network, requesting the peer the information of which is acquired to download a file, and acquiring the cached resources. In the cache process step, when the information of the peer which caches resources from the cache management information cannot be acquired, after a peer which provides the resources is requested to download a file, and the information of the peer which caches the resources is registered in the cache management information. For this reason, the resources which are downloaded once are cached by a peer of the network. Only the cache management information of the resources are managed by a registry server, and cache data are separately stored in peers which open disk resources on the network. For this reason, the cache can be easily increased at a low cost by distributed cache obtained by opening the disk resources of the peers. The distributed file management method according to the present invention further includes the site searching step of analyzing a log of a cache access to the cache management information to automatically extract a site to be used.

According to the present invention, a program which is executed by peers connected in a peer-to-peer manner through a network. This program causes a computer serving as peers to execute:

the management information generating step of generating management information of disks opened by the plurality of peers connected through the network;

the access request step of selecting another peer which opens a disk from the management information to request a file to be stored or read; and the step of storing or reading the file in response to the storage request or the read request from the other peer. The details of the program are essentially the same as those of the distributed file management method.

The above and other objects, features, and advantages of the present invention will become more apparent from the following details description with reference to the drawings.

BRIEF DESCRIPTION OF THE DRAWINGS

FIG. 4 is a diagram for explaining an open disk management table in FIG. 3.

FIG. 5 is a diagram for explaining a distributed file management table in FIG. 3.

FIG. 15 is a diagram for explaining an open disk management table in FIG. 14.

FIG. 16 is a diagram for explaining a distributed file management table in FIG. 14.

DESCRIPTION OF THE PREFERRED EMBODIMENTS

Figure 1:
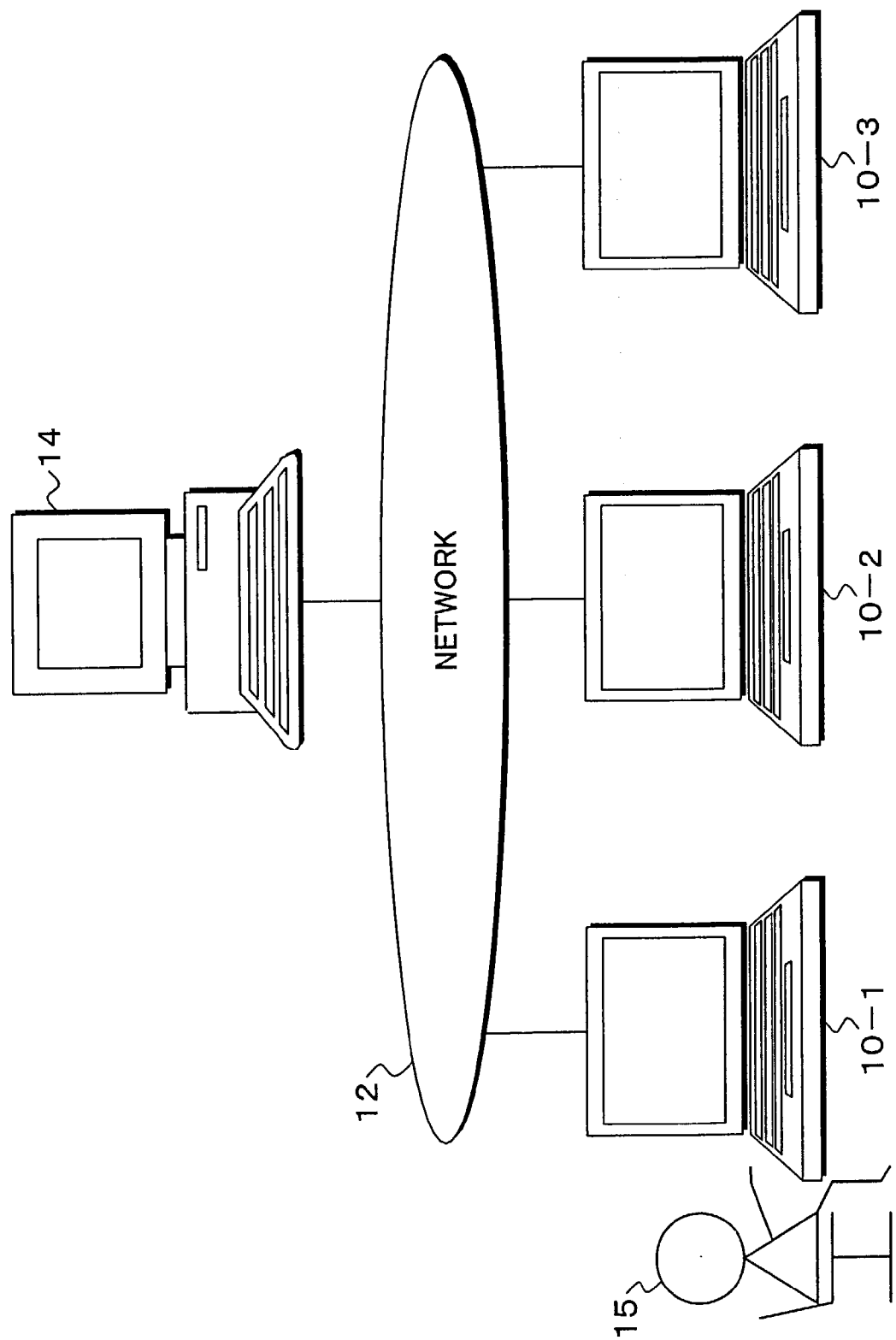
FIG. 1 is a diagram for explaining a peer-to-peer type network to which a distributed file management process according to the present invention is applied.

FIG. 1 is a diagram for explaining a-peer-to-peer type network configuration to which a distributed file management process according to the present invention is applied. Peers 10-1, 10-2, and 10-3 are always connected to each other through a network 12 such as the internet. A peer sharing program which realize a distributed file management process according to the present invention is installed in each of the peers. A registry server 14 is connected through the network 12. The registry server 14 stores management data required for distributed file management in the peers 10-1 to 10-3 at once. The peers 10-1 to 10-3 and the registry server 14 are computers each of which comprises a hardware configuration shown in FIG. 2.

Figure 2:
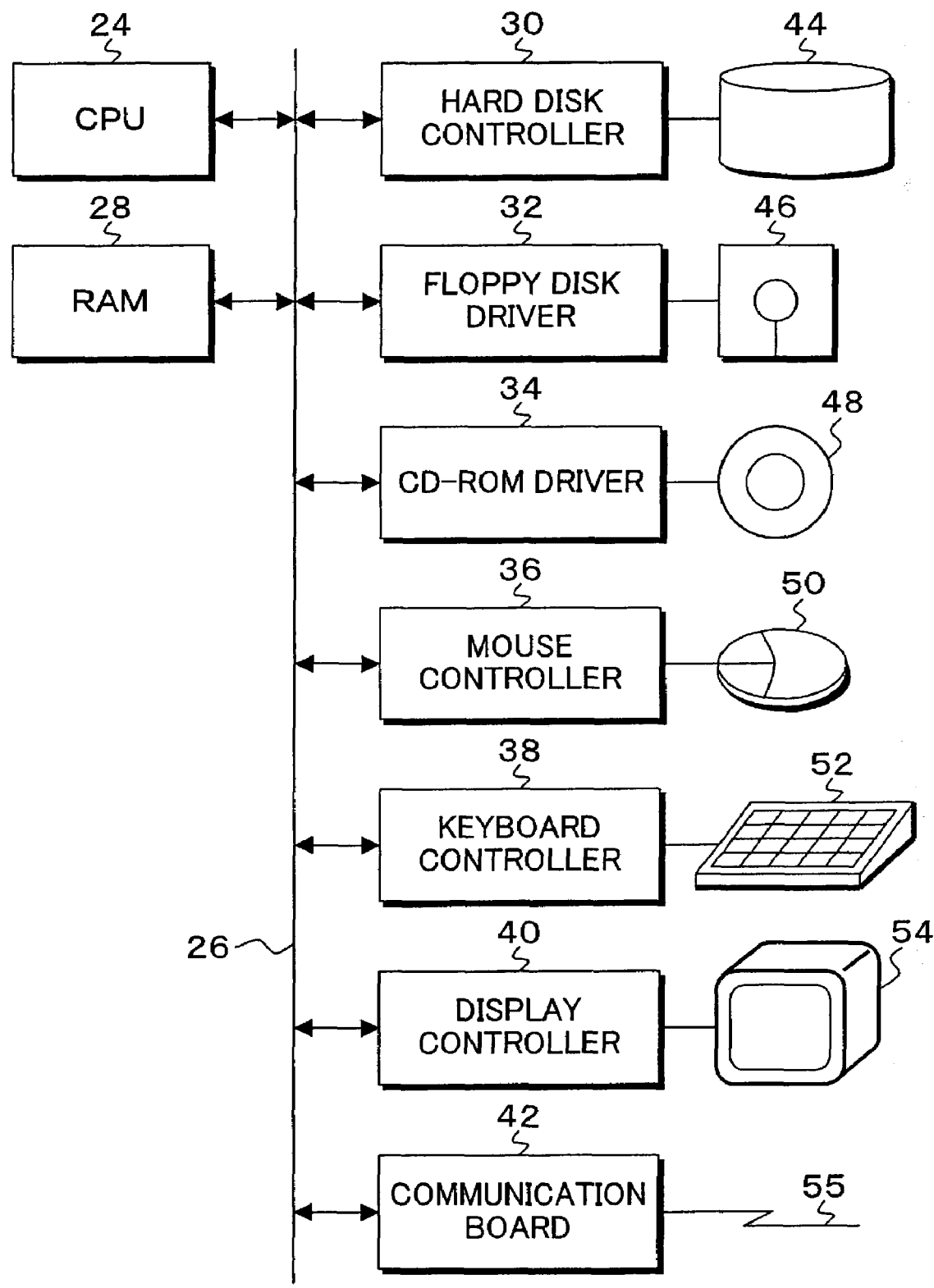
FIG. 2 is a block diagram of a hardware configuration of a computer which realizes a peer and a registry server in FIG. 1.

A RAM 28, a hard disk controller 30, a floppy disk driver (software) 32, a CD-ROM driver (software) 34, a mouse controller 36, a keyboard controller 38, a display controller 40, and a communication board 42 are connected to a bus 26 of a CPU 24 in the computer in FIG. 2. The hard disk controller 30 is connected to the hard disk drive 44 and loads an application program for realizing the distributed file management process according to the present invention. The hard disk controller 30 reads the distributed file management process from a hard disk drive 44 when a peer is started to develop the distributed file management process on the RAM 28. The distributed file management process is executed by the CPU 24. A floppy disk driver (hardware) 46 is connected to the floppy disk driver (software) 32, so that data can be read from or written in a floppy disk. A CD drive (hardware) 48 is connected to the CD-ROM driver (software) 34, so that data or a program which is recorded on a CD can be loaded. The mouse controller 36 transmits an input operation of a mouse 50 to the CPU 24. The keyboard controller 38 transmits an input operation of a keyboard 52 to the CPU 24. The display controller 40 performs display on a display unit 54. The communication board 42 performs communication with another peer through a communication line 55 and the network 12 in FIG. 1.

Figure 3:
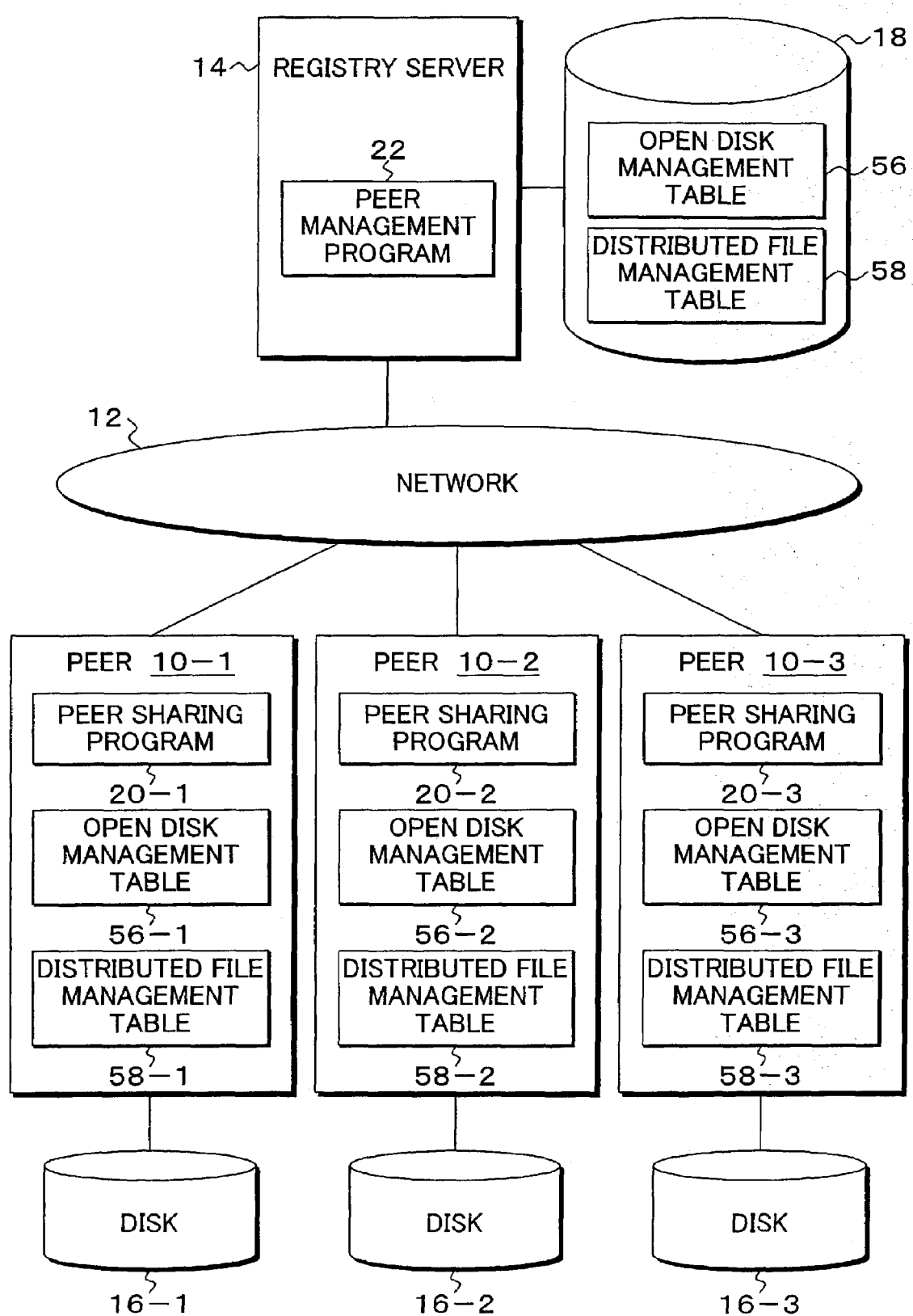
FIG. 3 is a block diagram of a function configuration serving as an embodiment of distributed file management according to the present invention.

FIG. 3 is a block diagram of a function configuration obtained when the distributed file management process according to the present invention is applied to the peer-to-peer type network configuration in FIG. 1. The peers 10-1, 10-2, and 10-3-comprise logical disks 16-1, 16-2, and 16-3 serving as CPU resources, respectively. In a distributed file management process according to the present invention, the peers 10-1 to 10-3 allow the network 12 to use free areas of their disks 16-1 to 16-3, so that files can be stored by another peer. In this manner, since a peer opens its own disk to store a file of another peer in the disk, peer sharing programs 20-1, 20-2, and 20-3 are set in the peers 10-1 to 10-3, respectively. A peer management program 22 is installed in the registry server 14, an open disk management table 56 and a distributed file management table 58 stored in a disk 18 are managed. In the open disk management table 56, management information related to the logical disks 16-1, 16-2, and 16-3 opened by the peers 10-1 to 10-3 is stored. In the distributed file management table 58, management information of distributed files obtained such that the peers 10-1 to 10-3 store files in an open disk of another peer is stored. When the peers 10-1 to 10-3 are connected to the network 12, copies of the open disk management table 56 and the distributed file management table 58 stored in the registry server 14 are generated and updated as open disk management tables 56-1, 56-2, and 56-3 and distributed file management tables 58-1, 58-2, and 58-3 in the peers 10-1 to 10-3, respectively.

FIG. 4 is a diagram for explaining the open disk management table 56 stored in the registry server 14 in FIG. 3. In the open disk management table 56, a peer name, an IP address, the capacity of a disk opened by the peer, and a free area of the disk at the present time are registered. For this reason, when a file is to be stored in another peer, an open state of a disk opened by the other peer can be recognized with reference to the open disk management table 56. A peer in which a file is to be stored is selected by designation of a user or automatically selected, and the file can be stored by acquiring the IP address of the selected peer.

FIG. 5 is a diagram for explaining the distributed file management table 58 stored in the registry server 14 in FIG. 3. The distributed file management table 58 registers the name of a peer which is to be stored in relation to a file name. For this reason, when the peer reads or rewrites a file which is stored once, the peer acquires the name of a peer in which a file is to be stored with reference to the distributed file management table 58 by a target file name. The peer acquires an IP address from a peer name with reference to the open disk management table 56 in FIG. 4 and can access the peer in which a file is to be stored. In the distributed file management table 58 in FIG. 5, distributed files stored in a plurality of peers are registered in the table at once. However, another table structure, distributed file management tables may be separately formed for peers, respectively.

Figure 6:
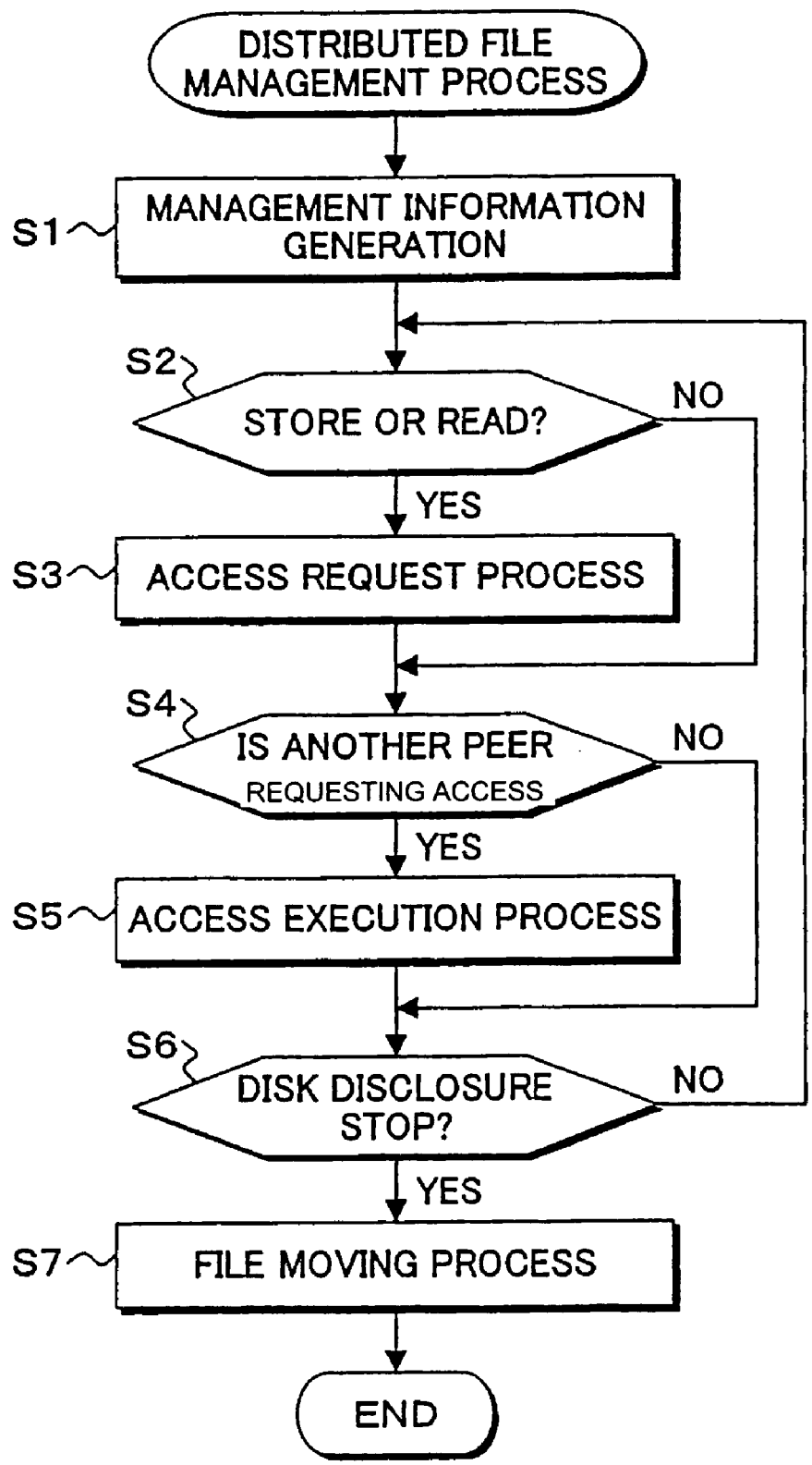
FIG. 6 is a flow chart of basic procedures of a distributed file management process according to the present invention.

FIG. 6 is a flow chart of basic procedures of a distributed file management process performed by the peer sharing programs 20-1, 20-2, and 20-3 arranged in the peers 10-1 to 10-3 in FIG. 3. In the distributed file management process, a management information generating process is performed in step S1. In the management information generating process, for example, when the peer 10-1 in FIG. 3 is connected to the network 12, the peer 10-1 sets a user name, an IP address, and the capacity of a disk opened by the peer 10-1 for the registry server 14. Thereafter, as management information of disks opened by the other peers 10-2 and 10-3 connected through the network 12 managed by the registry server 14, the open disk management table 56-1 and the distributed file management table 58-1 which are copies of the open disk management table 56 and the distributed file management table 58 are acquired and generated. Subsequently, when a file is stored or read in the peer 10-1 itself in step S2, the control flow shifts to step S3 to select another peer which opens a disk from the open disk management table 56-1 and the distributed file management table 58-1 and to execute an access request process of requesting storage of a file and read of the file. By the access request process, a file can be stored in a disk opened by the selected peer, or a file which has been stored can be read. Subsequently, request of another peer is checked in step S4. When a request is received from another peer, the control flow shifts to step S5, an access corresponding to a storage request of a file or a read request of a file from the other peer is executed. While the processes for the distributed file management in steps S2 to S5 are executed, when the disclosure of the disk must be stopped due to disorder of the peer or the like in step S6, the control flow shifts to step S7. At this time, the file moving process of moving distributed files of another peer stored in the disk 16-1 to still another peer.

Figure 7:
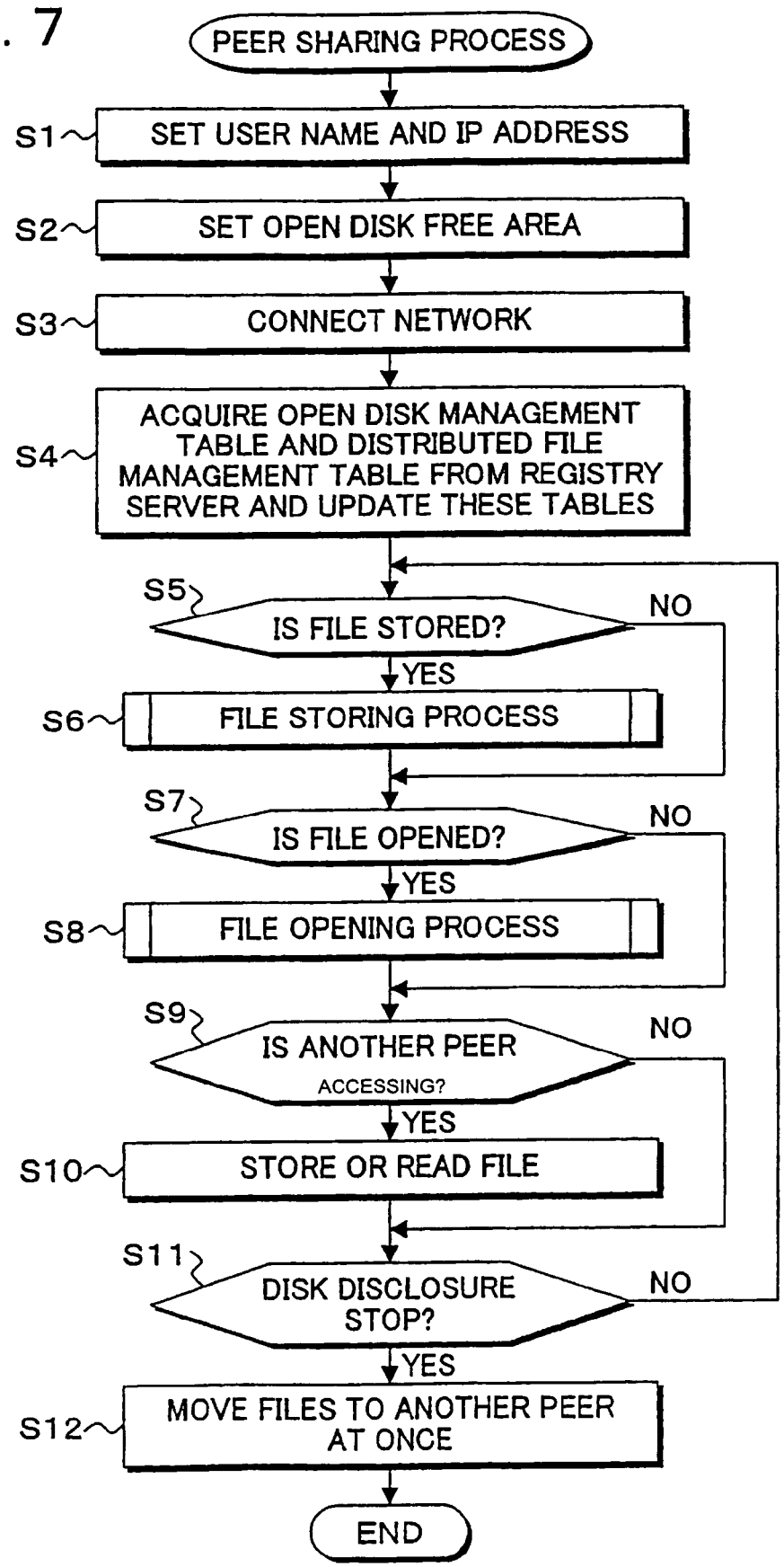
FIG. 7 is a flow chart of a peer sharing process performed by a peer sharing program in FIG. 3.

FIG. 7 is a flow chart showing the distributed file management process in FIG. 6 as a process of a peer sharing program, i.e., a sharing process in details. The peer sharing process in FIG. 7 will be described below while the peer 10-1 in FIG. 3 is exemplified. When the sharing program 20-1 is started in the peer 10-1, a user name, e.g., "PC1" and an IP address "aaa. aaa. aaa" are set in step S1. In step S2, a capacity of the disk 16-1 to be opened is set. For example, when it is assumed that the capacity of the disk 16-1 of the peer 10-1 is 30 GB, 10 GB which is ⅓ the capacity is set as an open disk capacity. In step S3, connection to the network 12 is performed in step S3. In this manner, the user name, the IP address, and the open disk capacity set in steps S1 and S2 are noticed to the registry server 14. Therefore, the peer management program 22 of the registry server 14 registers the peer name "PC1", the IP address "aaa. aaa. aaa", and the open disk capacity of 10 GB in the open disk management table 56 in FIG. 5 with respect to the peer 10-1 connected to the network 12. At the first, the disk free area of the peer 10-1 is equal to the open disk capacity, i.e., 10 GB. In step S4, the open disk management table 56 and the distributed file management table 58 at the present are acquired from the registry server 14, and the open disk management table 56-1 and the distributed file management table 58-1 which have been held as the copies of the open disk management table 56 and the distributed file management table 58 are updated. As a matter of course, in the first network connection, the copies of the open disk management table 56 and the distributed file management table 58 serve as the open disk management table 56-1 and the distributed file management table 58-1. By the steps S1 to S4, the peer 10-1 establishes available state of the open disks of the other peers 10-2 and 10-3 connected through the network 12. When file formation, edition, and the like of the user by the peer 10-1 are finished in step S5 to determine file storage, a file storing process is executed in step S6. When an open file which requires a file stored in another peer is determined in step S7, a file opening process is executed in step S8. When the file is accessed from the external peers 10-2, 10-3, and the like in step S9, the file is stored or read in step S10. In the distributed file management process according to the present invention, it is supposed that the peers 10-1, 10-2, 10-3, . . . which open disks to the network 12 are always connected to the network 12. When the peers 10-1, 10-2, 10-3, . . . are disconnected from the network 12, the distributed files cannot be accessed by the other peers. For this reason, in this case, the disk disclosure is stopped. When the stop of the disk disclosure is determined in step S11, after the distributed files stored in the peer 10-1 at this time are moved to another peer at once, the peer 10-1 is disconnected from the network. In this manner, the peer sharing process is completed.

Figure 8:
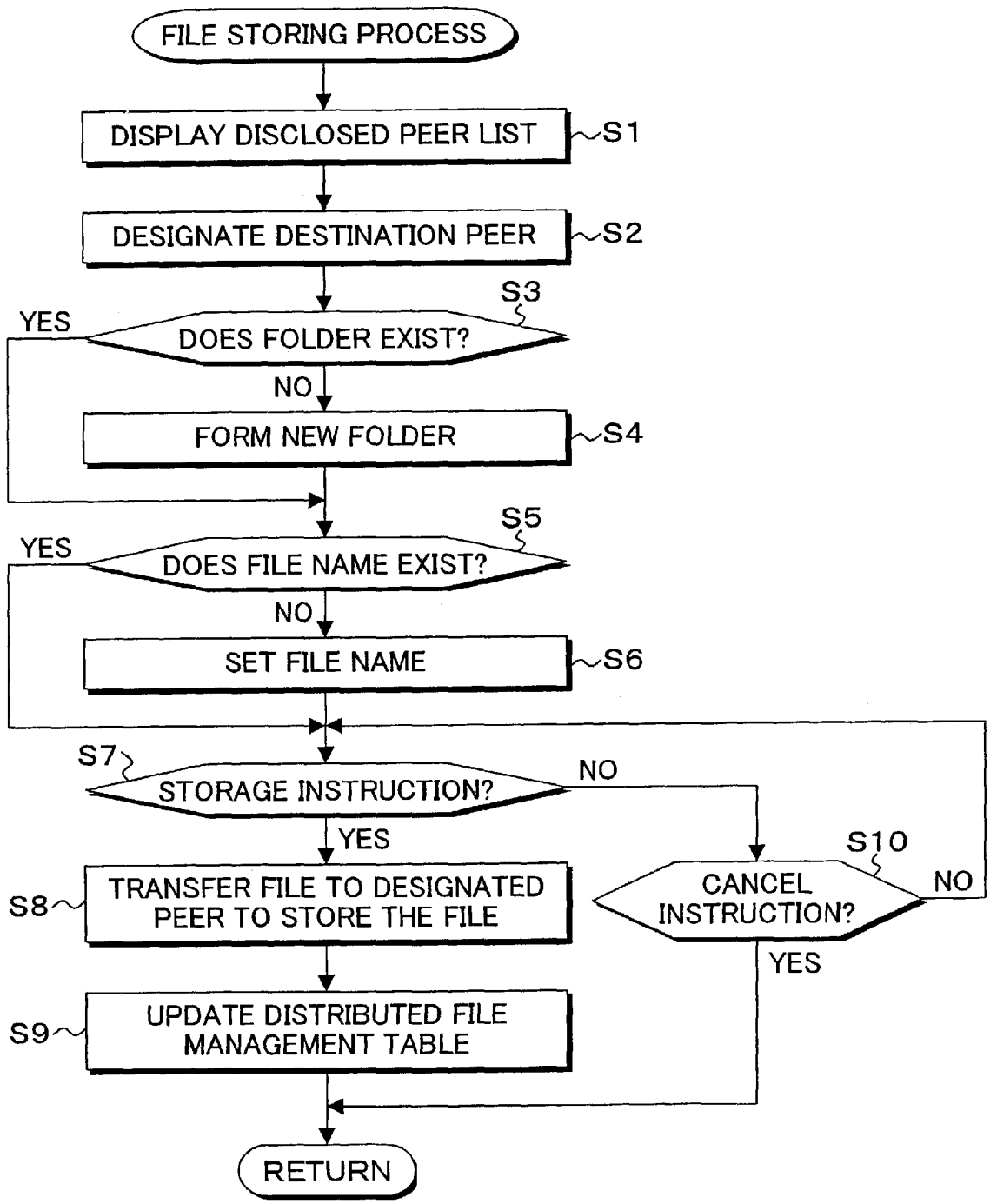
FIG. 8 is a flow chart of a file storing process in FIG. 7.

FIG. 8 is a flow chart showing the details of a file storing process performed by the peer 10-1 in step S6 in FIG. 7. When the peer 10-1 stores a file in another peer which discloses a disk to the network 12, in step S1, a list of disclosed peers which open disks is displayed on the basis of the open disk management table 56-1 having the contents in FIG. 5. A user designates a peer in which a file is to be stored in step S2 with reference to the displayed list. Subsequently, it is checked in step S3 whether a folder for storage exists or not. When the folder does not exist, a new folder is formed in step S4. It is checked in step S5 whether the file name of a stored file exists or not. When the file has no file name, a file name is set in step S6. When a file is designated to be stored in step S7, in step S8, the file is transferred to another peer by using the IP address of the designated peer in step S2 and stored in the peer. In step S9, the open disk management table 56-1 is updated. If no storage designation exists in step S7, cancel designation is checked in step S10. If the cancel designation exists, the file storage process is ended.

In the file storing process in FIG. 8, a user designates a peer in which a file is to be stored in step S2 with reference to the disclosed peer list displayed in step S1. However, the peer in which a file is to be stored may be automatically designated. For example, with reference to the open disk management table 56-1 having the contents in FIG. 4, a peer having the largest disk free area is designated as a peer in which a file is to be stored to store a file. In the process of automatically designating another peer to store a file, the peer sharing program conceals the correspondence to the disk of another peer from a user. It appears from the user that a huge disk exists in the network itself. In this manner, the user can manage a large storage area existing on the network without managing the peer name (computer name) of the peer in which a file is to be stored. More specifically, by storing a file by the peer sharing program performed by the open disk management table 56 as shown in FIG. 4, a user can imaginarily use the network itself as if one disk.

Figure 9:
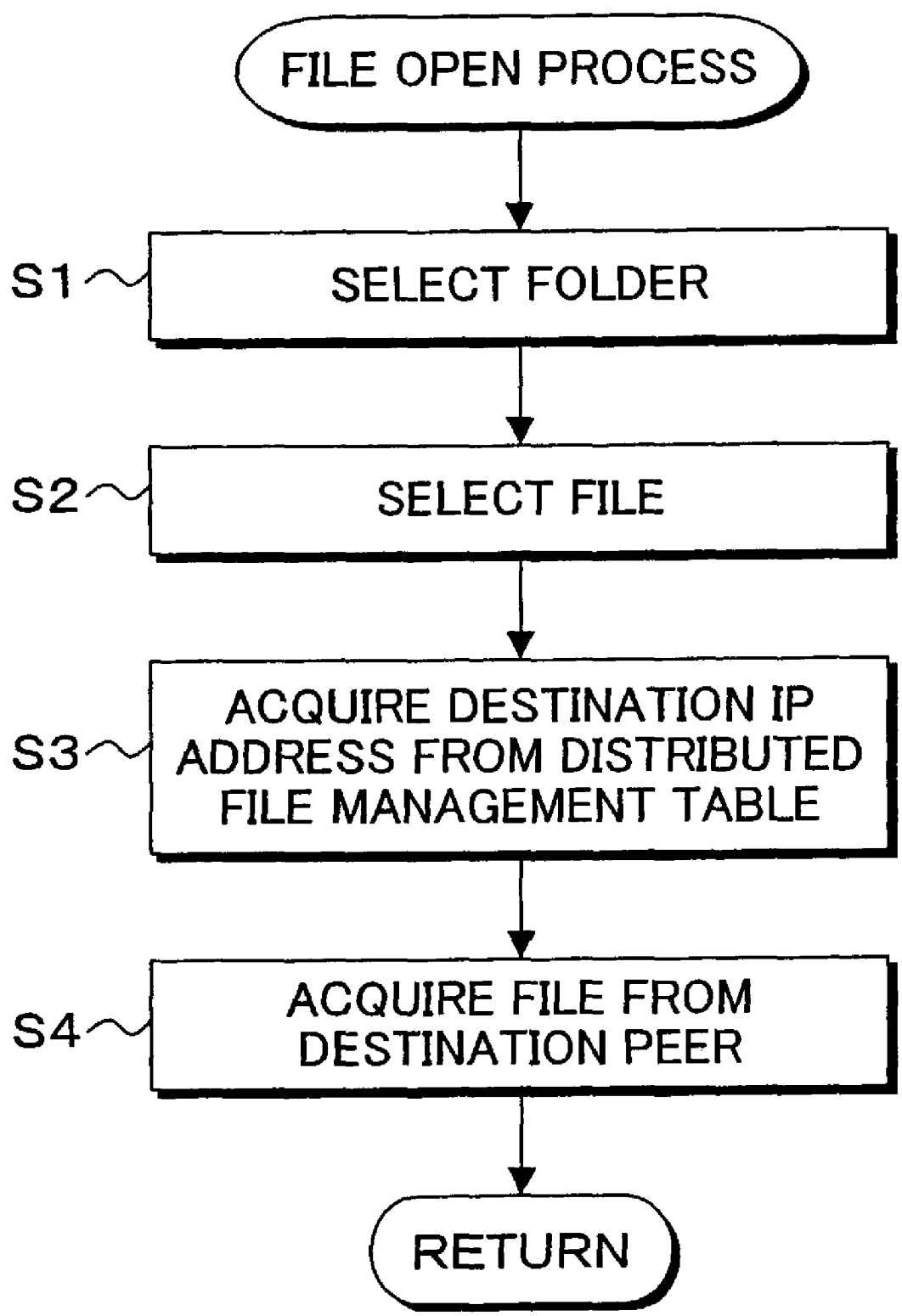
FIG. 9 is a flow chart of a file open process in FIG. 7.

FIG. 9 is a flow chart showing the details of the file opening process in step S8 in FIGS. 7 and 8. In this file opening process, a user targets a file stored in another peer to select a folder in step S1. When the user selects a file in step S2, the user acquires the IP address of a peer in which a file is to be stored with reference to the distributed file management table 58-1 of the peer 10-1 and accesses the peer in which a file is to be stored, so that the user can acquire a designated file from the disk in which a file is to be stored in step S4.

Figure 10:
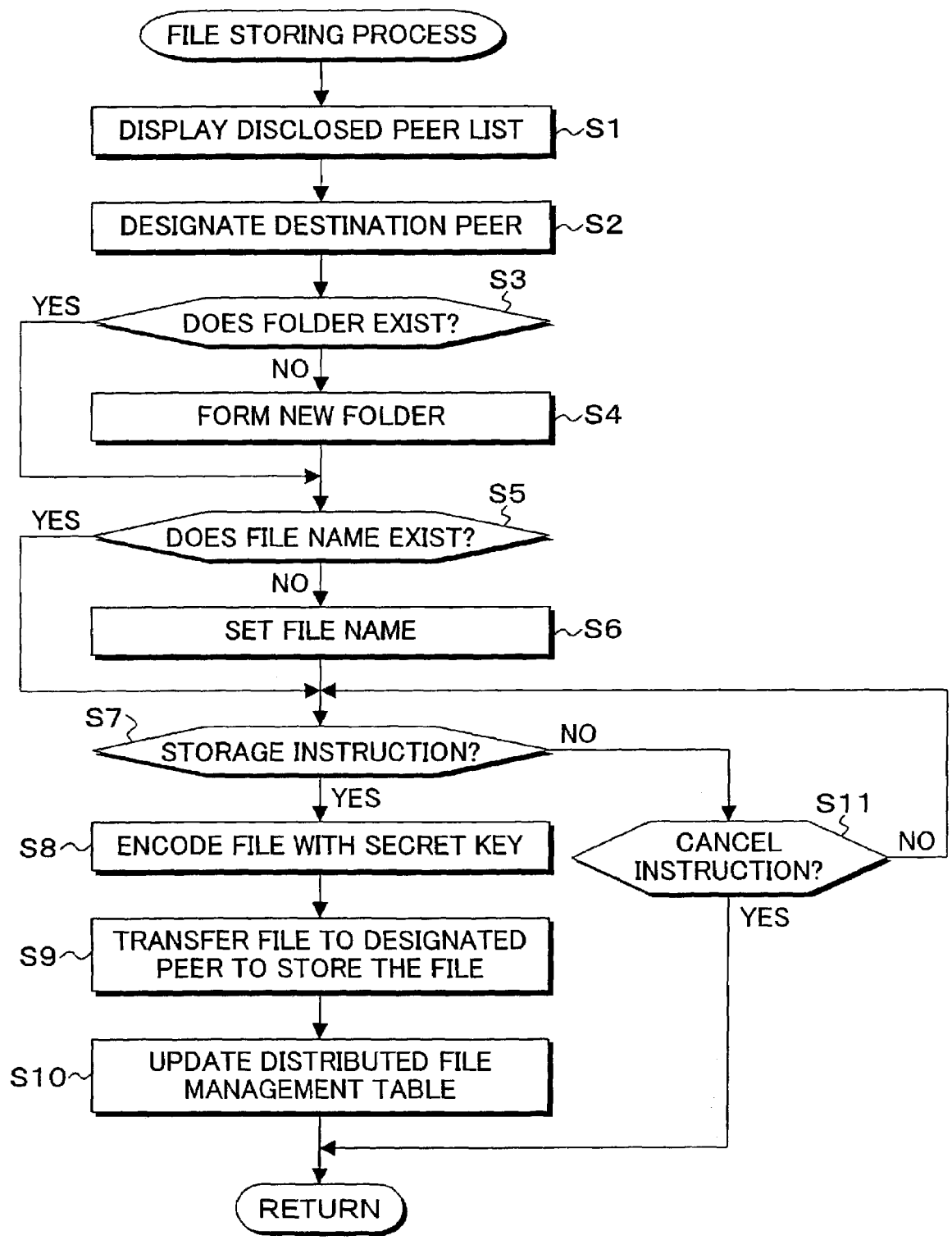
FIG. 10 is a flow chart of a file storing process in FIG. 7 which encodes a file by a secret key.

FIG. 10 is a flow chart of another embodiment of a file storing process in step S6 in FIG. 7. In this embodiment of the file storing process, when another peer is designated to store a file in step S8, the file is encoded with a secret key. The file is transferred to the designated peer and stored in the peer in step S9. The other processes are the same as those in FIG. 8. In this manner, when the file stored in another peer is encoded with the secret key, a file of a specific user stored in the peer in which a file is to be stored cannot be seen by another user, and the security of distributed files can be achieved.

Figure 11:
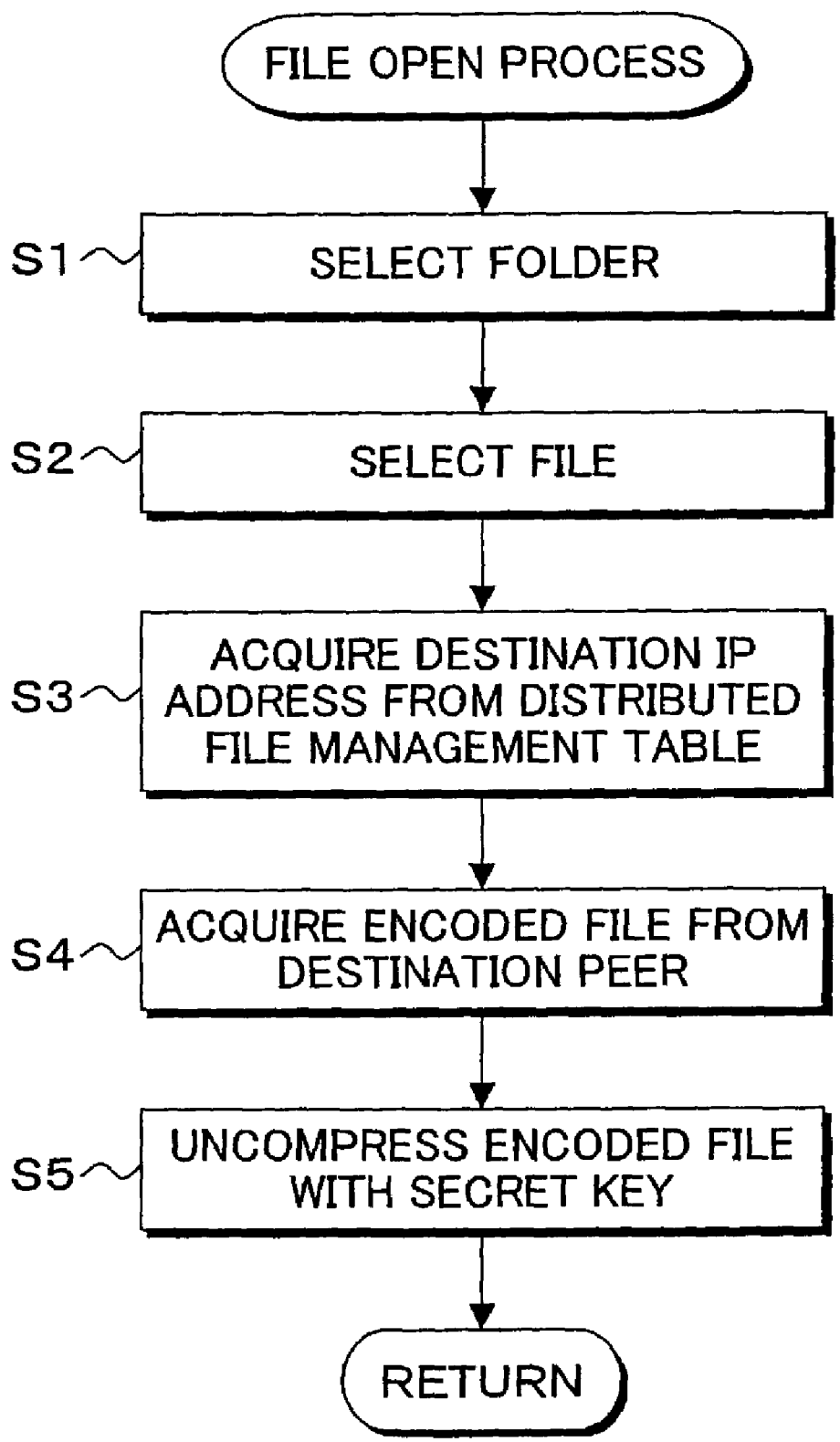
FIG. 11 is a flow chart of a file open process corresponding to FIG. 10.

FIG. 11 is a flow chart of a file opening process when a file is encoded with a secret key and stored. This file opening process is basically the same as that in FIG. 9 except that the encoded file is decoded with the secret key in step S5 after the encoded file is acquired from the peer in which a file is to be stored in step S4.

Figure 12:
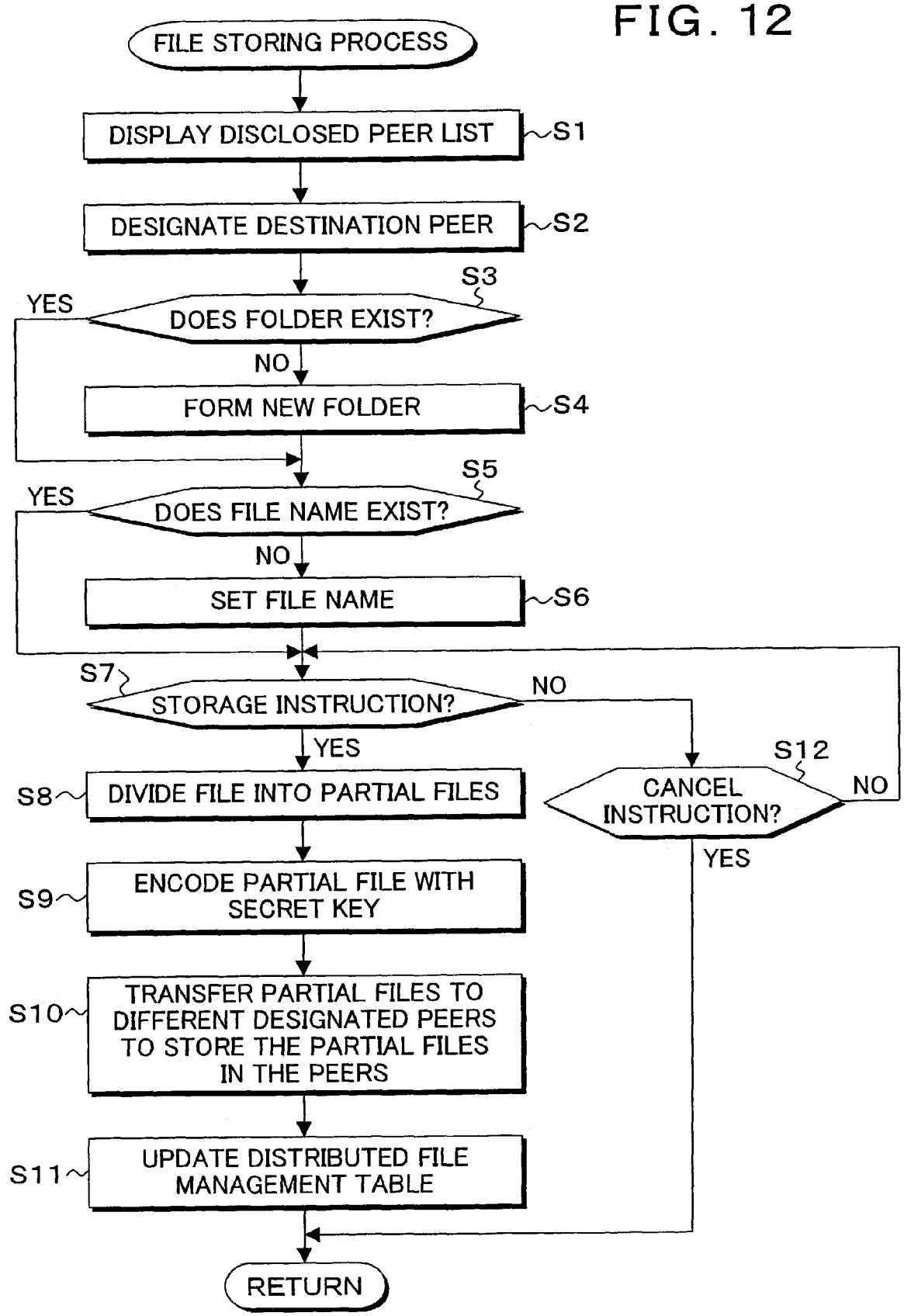
FIG. 12 is a flow chart of the file storing process in FIG. 7 which divides a file and encodes the divided files by secret keys.

FIG. 12 is a flow chart of still another embodiment of the file storing process in step S6 in FIG. 7. This file storing process has the following characteristic feature. That is, a file to be stored in another peer is divided into a plurality of partial files in step S8, the partial files are encoded with secret keys in step S9, and the partial files are transferred to different designated peers and stored in the peers in step S9. The other processes are the same as those in FIG. 8. In this manner, a file to be stored in another peer is divided into a plurality of partial files, the partial files are encoded with secret keys, respectively, and the encoded partial files are stored in different designated peers. Therefore, the security of distributed files can be made more strong.

Figure 13:
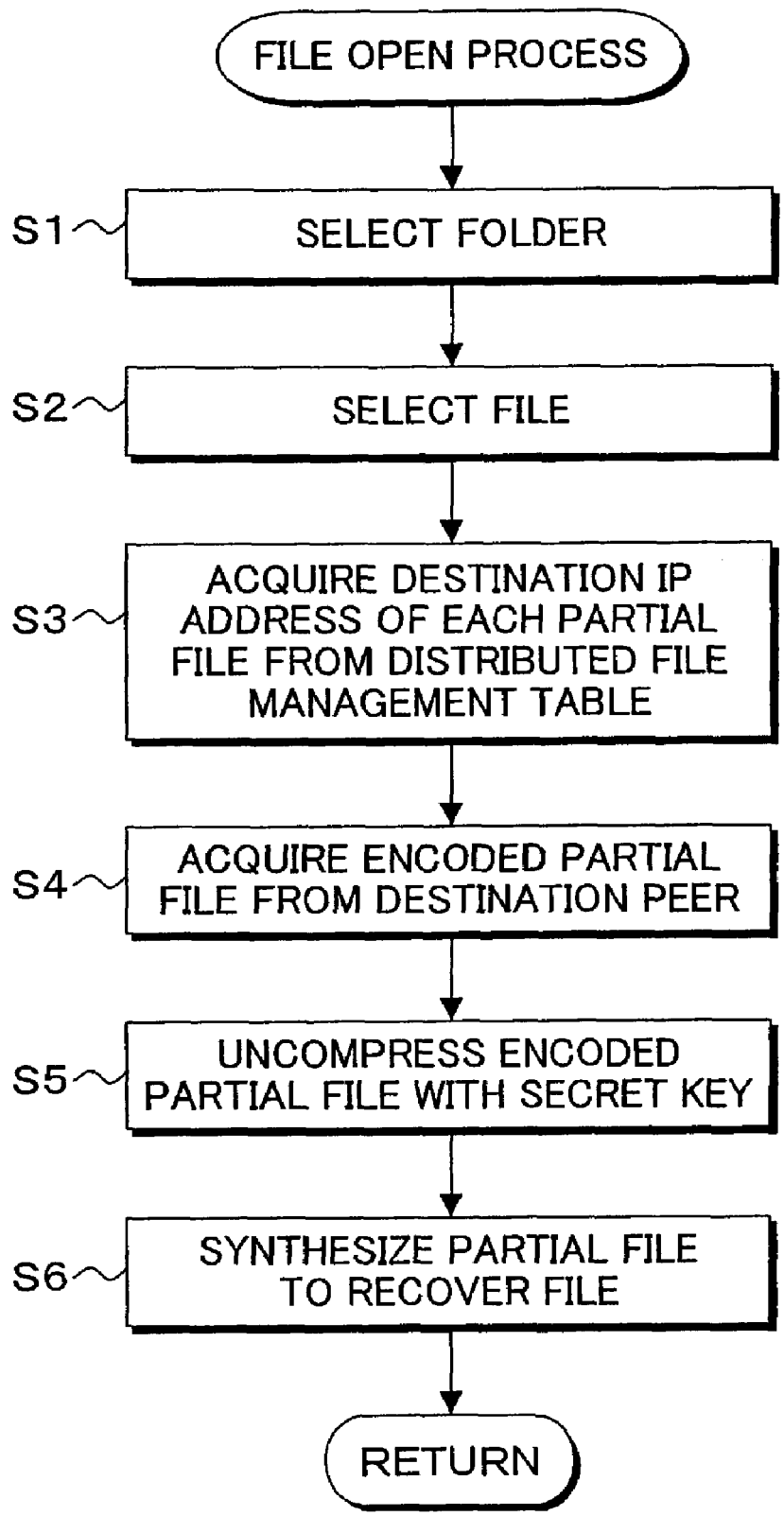
FIG. 13 is a flow chart of a file open process corresponding to FIG. 12.

FIG. 13 is a flow chart of a file opening process corresponding to the file storing process in FIG. 12. This file opening process is basically the same as that in FIG. 9. The file opening process corresponds to the storing process of encoding partial files with secret keys to store the partial files in different peers in FIG. 11. In this process, the IP addresses of peers in which the partial files are to be stored are acquired from the distributed file management table in step S3, and the encoded partial files are acquired from the peers in which the files are stored in step S4. The encoded partial files are decoded by secret keys in step S5, and the decoded partial files are synthesized to recover the file in step S6.

Figure 14:
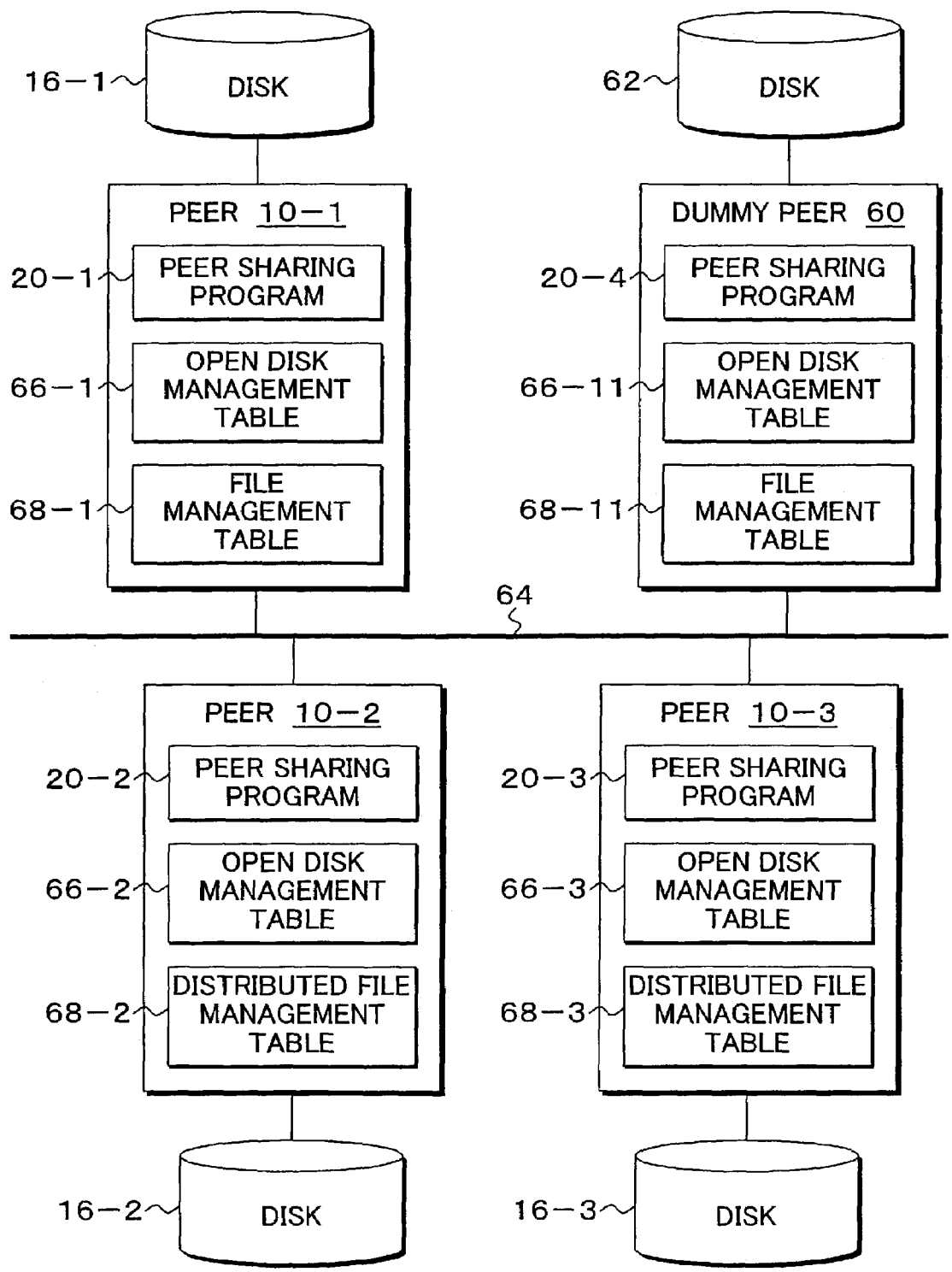
FIG. 14 is a function block diagram of another embodiment of the present invention in which peers are connected by a sub-network to make a registry server unnecessary.

FIG. 14 is a block diagram of a function configuration in still another embodiment of the present invention. This embodiment is characterized in that the registry server 14 according to the embodiment in FIG. 3 is not required. As described above, since a file is shared by a network without requiring a registry server, peers 10-1, 10-2, and 10-3 are connected to the same sub-network 64. The peers 10-1 to 10-3 connected to the sub-network 64 use a broadcast function, i.e., a 1-to-n communication function of a UDP (User Datagram Protocol) held by the sub-network 64 to make batch management of management information related to an open disk by a registry server unnecessary. In the peers 10-1 to 10-3 connected to the sub-network 64, peer sharing programs 20-1, 20-2, and 20-3 are arranged, respectively. The peers 10-1 to 10-3 comprise open disk management tables 66-1 to 66-3 and distributed file management tables 68-1 to 68-3, respectively. A distributed file management system using the sub-network 64 is basically constituted by the peers 10-1 to 10-3. However, in this embodiment, a dummy peer 60 is further arranged. The dummy peer 60 is a computer which is always connected to the sub-network 64 but which is not generally used. For example, by mirroring of the open disk management table 66-1 and the distributed file management table 68-1 held by the peer 10-1, an open disk management table 66-11 and a distributed file management table 68-11 which are copies of the open disk management table 66-1 and the distributed file management table 68-1 are held. By the mirroring of management information related to an open disk by the dummy peer 60, a file can be recovered by using the management information mirrored in the dummy peer 60 even if the peer 10-1 is disconnected from the sub-network 64 due to disorder or the like to stop disk disclosure.

FIG. 15 is a diagram for explaining the open disk management table 66-1 arranged in the peer 10-1 in FIG. 14. In the open disk management table 66-1, a peer name, an IP address, and a disk free area are registered. The contents of the open disk management table 66-1 are generated by the following method. That is, by using a broadcast function obtained by an UDP when the peer 10-1 is connected to the sub-network 64, a user accesses the other peers 10-2, 10-3, . . . to acquire the IP addresses of the peers and opened disk free areas. The contents of the open disk management table 66-1 in the peer 10-1 are the same as that in the other peer 10-2 or 10-03. In the operation of the distributed file management process, the peers 10-2 and 10-3 access other peers by the broadcast function of the UDP at predetermined time intervals to acquire the latest disk free areas.

FIG. 16 is a diagram for explaining the distributed file management table 68-1 stored in the peer 10-1 in FIG. 14. In the distributed file management table 68-1, the name of a peer in which a file is to be stored is registered in relation to a file name. The distributed file management table 68-1 has table contents inherent to the peer 10-1. In the distributed file management tables 68-2 and 68-3 of the other peers 10-2 and 10-3, the names of peers in which files are to be stored are registered in relation to file names stored in the peers of the respective data.

Figure 17:
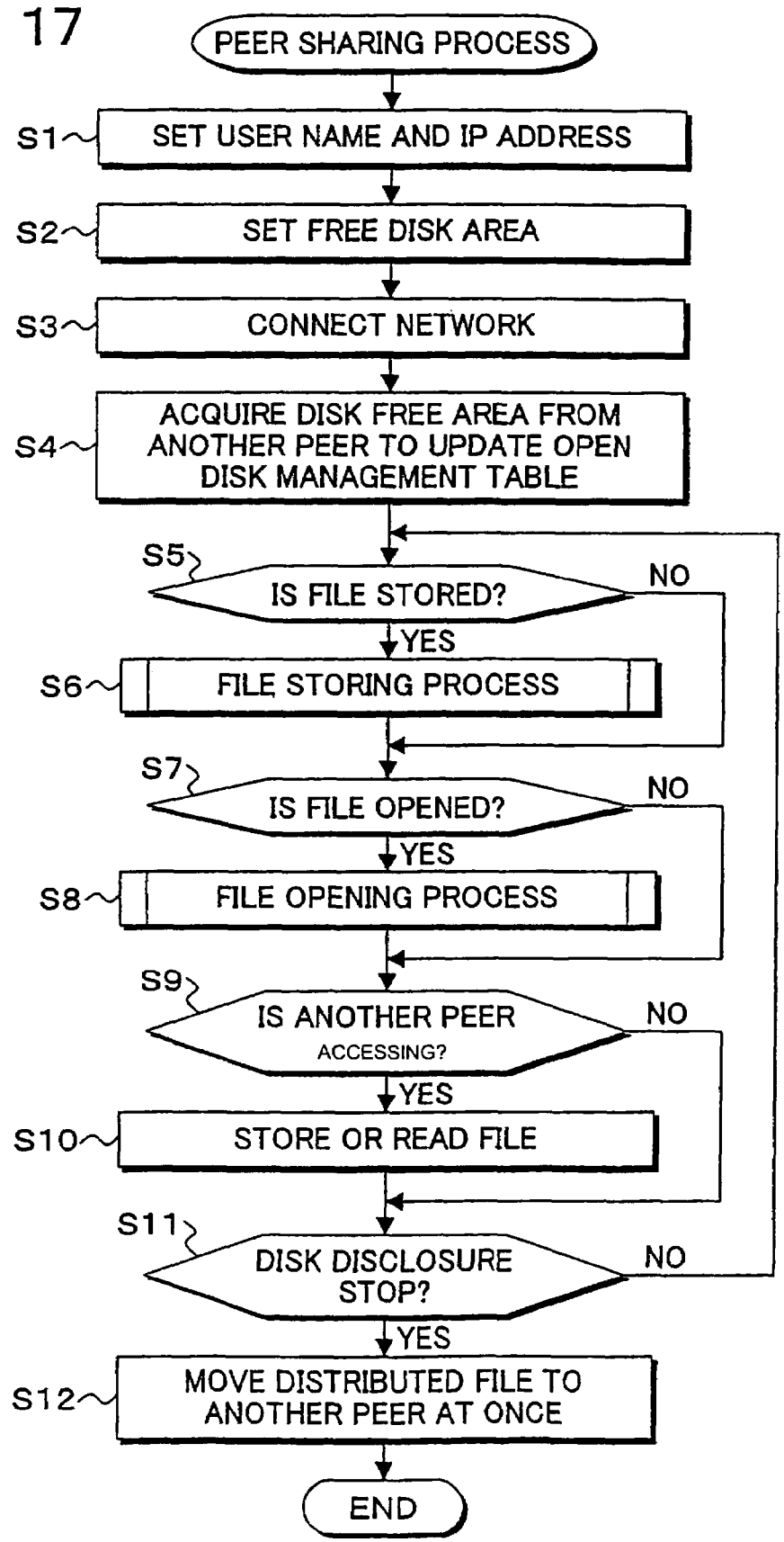
FIG. 17 is a flow chart of a pear sharing process performed by a peer sharing program in FIG. 14.

FIG. 17 is a flow chart of a peer sharing process executed by the peer sharing programs 20-1 to 20-3 in the embodiment in FIG. 14. The peer sharing process is different from the peer sharing process in FIG. 7 in the embodiment in FIG. 3 in the following point. That is, when setting of a user name and an IP address and setting of free disk area are completed when the peer sharing program is started, a peer is connected to the sub-network 64 in step S3, and the peer acquires a disk free space from another peer by the broadcast function of the UDP in step S4 to update the open disk management table. The steps subsequent to step S5 are basically the same as those in FIG. 7.

Figure 18:
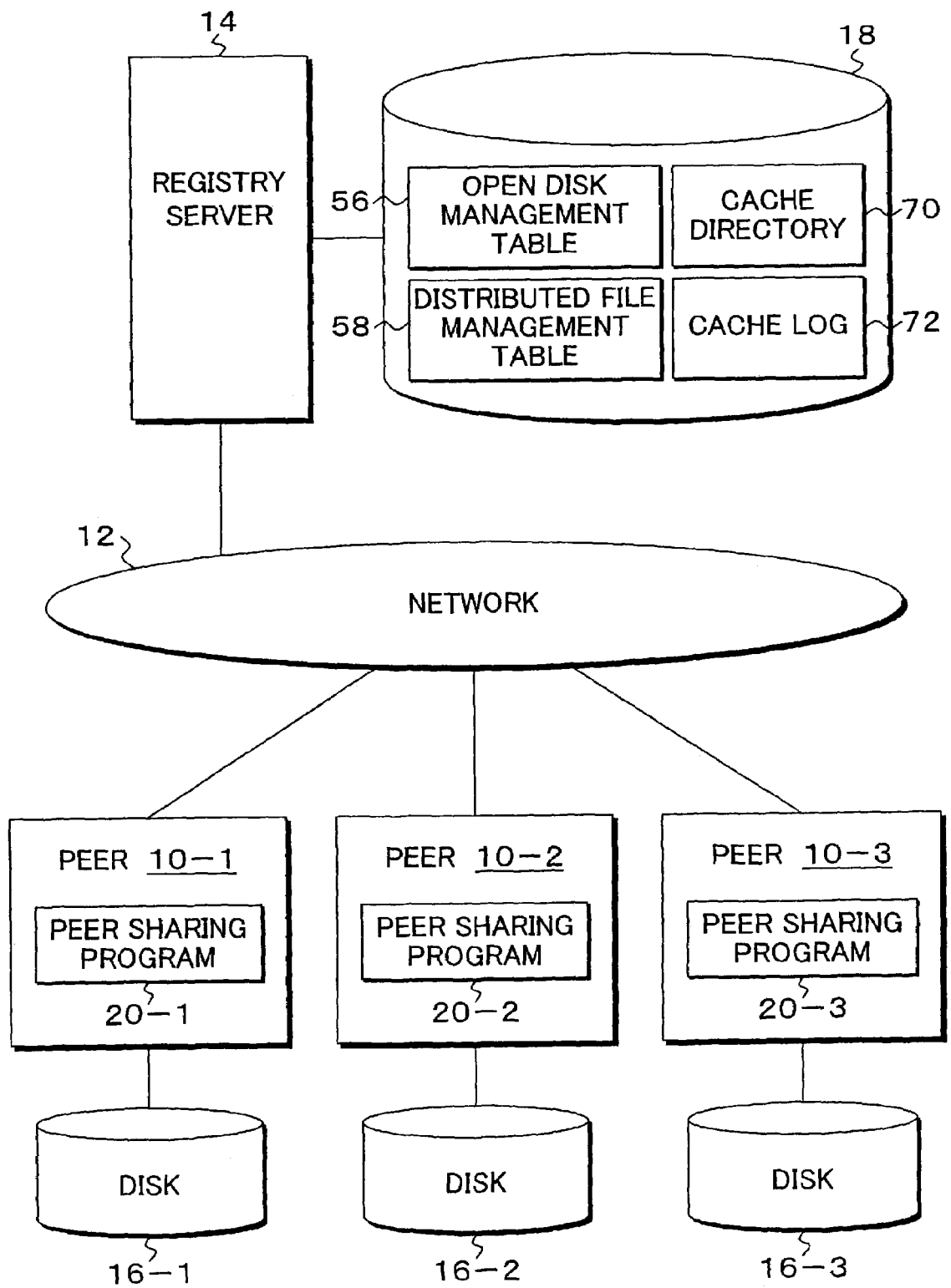
FIG. 18 is a function block diagram of another embodiment of the present invention which constitutes a cache system on a network.

FIG. 18 shows another embodiment of a distributed file management process according to the present invention. This embodiment is characterized in that disk areas opened by peers are used as cache areas for resources downloaded from a web of the Internet. Peers 10-1 to 10-3 are connected through a network 12, and a registry server 14 for batch management of the peers 10-1 to 10-3 is connected to the network 12. The peers 10-1 to 10-3 comprise peer sharing programs 20-1, 20-2, and 20-3, respectively. The peer sharing programs 20-1, 20-2, and 20-3 have download functions by resources obtained by a web or an FTP (file transfer protocol), and can download resources of a web or an FTP by using a URL. In a disk 18 of the registry server 14, an open disk management table 56 and a distributed file management table 58 which realizes the same distributed file management process as that of the embodiment in FIG. 3 are arranged. In contrast to this, the copies of the open disk management table 56 and the distributed file management table 58 are set to the peers 10-1 to 10-3. However, these operations are omitted in this embodiment. In the disk 18 of the registry server 14, a cache directory 70 functioning as a cache management table is arranged. Furthermore, a cache log 72 is set in the disk 18.

Figure 19:
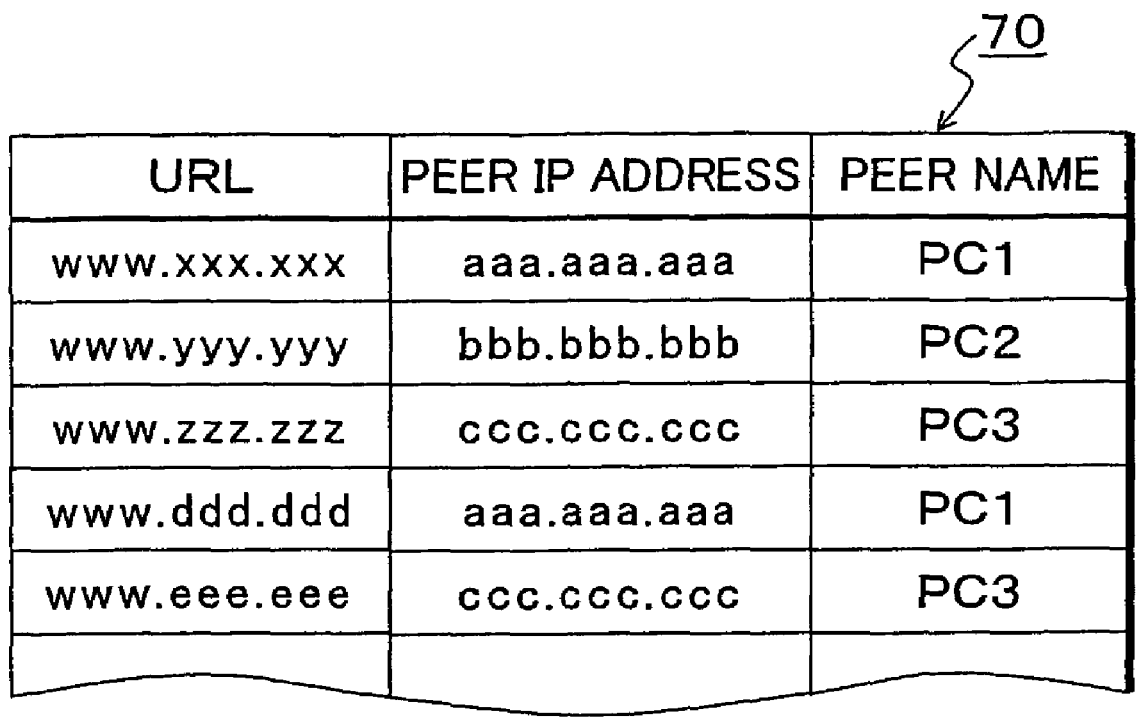
FIG. 19 is a diagram for explaining a cache directory in FIG. 18.

FIG. 19 is a diagram for explaining the cache directory 70 stored in the registry server 14. The cache directory 70, the IP address and the name of a peer in which a URL and resources downloaded by designating the URL are stored in a disk are registered.

Figure 20:
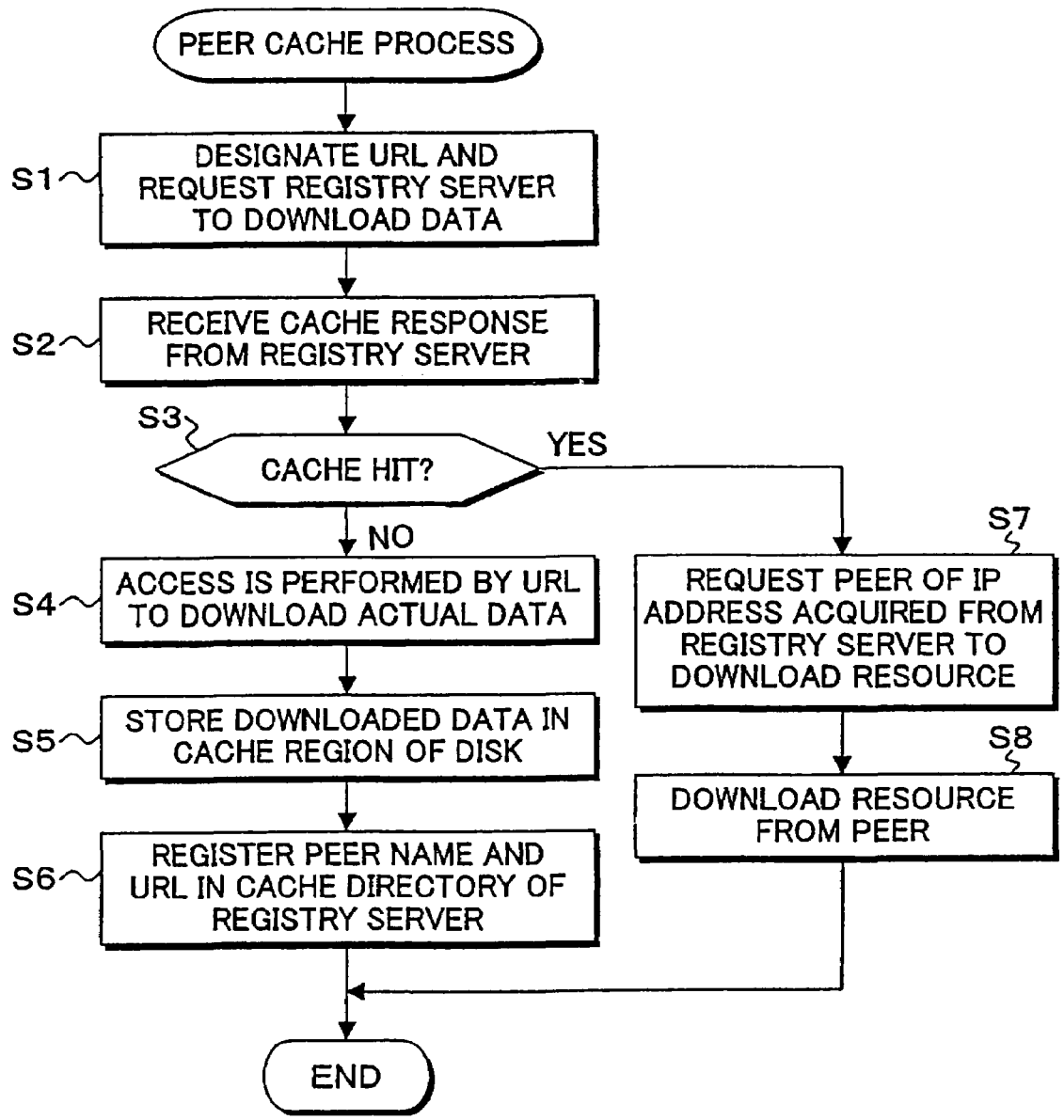
FIG. 20 is a flow chart of a peer cache process performed by a peer sharing program in FIG. 18.

FIG. 20 is a flow chart of a peer cache process executed by the peer sharing programs 20-1 to 20-3 set in the peers 10-1 to 10-3 in FIG. 18. The peer cache process will be described below with reference to the peer 10-1. When a user of the peer 10-1 designates a URL and downloads a program from the web site of the URL, the sharing program 20-1 starts a peer cache process, designates a URL given by the user in step S1, and requests the registry server 14 to download resources. In response to the download request made by designating a URL from the peer 10-1, the registry server 14 refers to the cache directory 70 of the disk 18 and returns the contents of directory registration related to the designated URL to the peer 10-1 as a cache response. For this reason, the peer 10-1 receives the cache response from the registry server in step S2 and checks the presence/absence of a cache hit with respect to the response contents in step S3. At this time, when the designated URL is not registered in the cache directory 70, the program of the URL is not cached on the disk of another peer. For this reason, In step S4, the peer 10-1 directly accesses the web site by the URL to download real data. The download data is stored in a cache area of the disk 16-1 in step S5. Furthermore, the URL, the peer IP address, and the peer name are registered in the cache directory 70 of the registry server 14 in step S6. On the other hand, with respect to the cache response from the registry server 14 in step S3, for example, the URL designated in step S1 is "www. zzz. zzz". When it is determined that the download data of the URL designated with reference to the cache directory 70 in FIG. 19 is cached in a peer PC3, the peer 10-1 receives the cache response in step S2, and a cache hit is established in step S3. In this case, a URL is designated for the peer 10-3 of the peer name "PC3" having the IP address "ccc. ccc. ccc" acquired from the registry server 14 in step S7 to request the peer 10-3 to download data. The peer 10-3 which receives the download request from the peer 10-1 reads download data of the designated URL stored in the logical disk 16-3 to transfer the download data to the peer 10-1 serving as a source. In step S8, the peer 10-1 substantially downloads the resources of the designated URL from the peer 10-3. In this manner, in the peers 10-1 to 10-3 connected through the network 12, once the resources obtained by the web of the designated URL, the FTP, and the like are downloaded, the download data is cached on the disk of a peer which downloads the resource for the first time. In the second and subsequent download operations, a download request to the registry server 14, and a peer which caches the data is recognized to download data from another peer. For this reason, a large-capacity caching system in which loads are distributed on a network can be structured. In the registry server 14 of the disk 18, a cache log 72 for the distributed cache system obtained by the peers 10-1 to 10-3 structured on the network 12 is generated. When the cache log 72 is analyzed, web sites can be ranked. Furthermore, when users who access the same site are grouped, various applications (e.g., users which have similar orientations can be recognized) of the cache log 72 can be expected.

According to the present invention as described above, disk resources of peers constituted by a plurality of computers connected in a peer-to-peer manner through a network are efficiently used, and distributed management of files can be achieved. Since management information of disk resources opened by the plurality of peers connected to the network is automatically generated, a user can efficiently perform distributed management such that a disk resource to be used is arbitrarily selected to store a file on the network.

Data is downloaded in a specific peer by using disk resources of peers realized by a plurality of computers connected in a peer-to-peer manner through a network, or the resources are cached by a peer connected to the network, and batch management of only cache information of the peer is performed. For this reason, a large-capacity cache system can be easily structured on the network at a low cost by distributed caches obtained by the disk resources of the peers.

The present invention includes appropriate modifications which do not deteriorate the objects and advantages of the invention. Furthermore, the present invention is not limited to the numerical values described in the embodiments.

What is claimed is:

1. A distributed file management method comprising:
a management information generating step of generating management information about disks that can be opened by a plurality of peers connected through a network;
an access request step of a first peer selecting another peer which opens a disk listed in the management information to request a file to be stored or read; and
an access execution step of executing the storage of the file or the read of the file in response to the storage request or the read request from the first peer;
further comprising a cache process step of acquiring information about a peer which will cache the resources from the cache management information of a registry server connected via the network when resources are to be downloaded
through the network, and requesting the peer described in the information to download a file to acquire the cached resources;
wherein in the cache process step, when the information about the peer which will cache the resources cannot be acquired from the cache management information,
after a peer which provides the resources is requested to download a file, the information about the peer which caches the resources is registered in the cache management information.

2. A method according to claim 1, wherein the cache management information includes open disk management information representing an address of a peer of a caching destination and a capacity of a free disk and distributed file management information representing the peer of the caching destination for storing a file.

3. A method according to claim 1, wherein
in the management information generating step, management information about a disk opened to said registry server is registered, and
in the access request step, the another peer is selected from the management information about the registry server to request storage or reading of a file.

4. A distributed file management method according to claim 1, wherein in the management generating step, a copy of the generated management information is stored in a specific peer to make it possible to restore the management information when the management information is lost.

5. A method according to claim 1, wherein in the access request step, when a file is stored in the another peer, the file is encoded and requested to be stored.

6. A method according to claim 5, wherein in the access request step, when a file is stored in the another peer, after the file is divided into a plurality of partial files, the partial files are respectively encoded and requested to be stored in other peers.

7. A method according to claim 1, further comprising a file moving step of moving stored files in the another peer to still another peer at once when access to a disk is stopped.

8. A method according to claim 1, further comprising a site searching step of analyzing a log of a cache access in the cache management information to automatically extract a site to be used.

9. A computer-readable storage storing a program for managing distributed files by controlling a computer and which causes a computer to execute:
a management information generating step for generating management information about disks that can be opened by a plurality of peers connected through a network;
an access request step of a first peer selecting another peer which opens a disk listed in the management information to request a file to be stored or read;
a step of storing or reading the file in response to the storage request or the read request from the first peer;
downloading resources from a website;
a cache processing step of acquiring cache management information from a registry server connected via the network;
requesting a receiver of said resources to acquire the resources when information about a peer of a caching destination cannot be acquired from said cache management information;
registering the information about the peer of the caching destination in said cache management information; and
requesting the peer of the caching destination to
acquire the resources when the information about the peer of the caching destination is acquired from said cache management information.

10. A storage according to claim 9, wherein the cache management information includes open disk management information representing the address of the peer of the caching destination and a capacity of a free disk and distributed file management information representing the peer of the caching destination for storing a file.

11. A storage according to claim 9, wherein in the management information generating step, management information about a disk opened to a registry server connected through the network is registered, and in the access request step, the another peer is selected from the management information about the registry server to request storage or reading of a file.

12. A storage according to claim 9, wherein in the management generating step, a copy of the generated management information is stored in a specific peer to make it possible to restore the management information when the management information is lost.

13. A storage according to claim 9, wherein in the access request step, when the file is stored in the another peer, the file is encoded and requested to be stored.

14. A storage according to claim 13, wherein in the access request step, when the file is stored in the another peer, after the file is divided into a plurality of partial files, the partial files are respectively encoded and requested to be stored in other peers.

15. A storage according to claim 9, further comprising a file moving step of moving stored files in the another peer to still another peer at once when access to the disk is stopped.

16. A storage medium according to claim 9, further comprising a site searching step of analyzing a log of a cache access in the cache management information to automatically extract a site to be used.

17. A computer functioning as a peer comprising:
a management information generating unit for generating management information about disks that can be opened by a plurality of peers connected through a network;
an access request unit for a first peer selecting another peer which opens a disk listed in the management information to request a file to be stored or read;
an access execution unit for storing or reading the file in response to the storage request or the read request from the first peer;

downloading resources from a website;

a cache processing step of acquiring cache management information from a registry server connected via the network;

requesting a receiver of said resources to acquire the resources when information about a peer of a caching destination cannot be acquired from said cache management information;

registering the information about the peer of the caching destination into said cache management information; and requesting the peer of the caching destination to acquire the resources when the information about the peer of the caching destination is acquired from said cache management information.

18. A method of managing files distributed among a plurality of peers connected through a network from a first peer, comprising:

generating management information about disks that can be opened by the plurality of peers connected through a network;

selecting one of the plurality of peers to open a disk listed in the management information and requesting a file to be stored or read on the disk;

storing or reading the file in response to the request to store or read the file;

downloading resources from a website;

acquiring cache management information from a registry server on the network;

acquiring the resources if information about a peer of a caching destination cannot be acquired from said cache management information;

registering the information about the peer of the caching destination in said cache management information; and requesting the peer of the caching destination to acquire the resources if the information about the peer of the caching destination can be acquired from said cache management information.

* * * * *